United States Patent
Orszulik

(10) Patent No.: US 7,146,669 B2
(45) Date of Patent: Dec. 12, 2006

(54) METHOD OF OPERATING A DOMESTIC APPLIANCE

(75) Inventor: Stefan Tadeusz Orszulik, Wantage (GB)

(73) Assignee: Dyson Technology Limited, Wiltshire (GB)

( * ) Notice: Subject to any disclaimer, the term of this patent is extended or adjusted under 35 U.S.C. 154(b) by 325 days.

(21) Appl. No.: 10/203,387

(22) PCT Filed: Aug. 16, 2001

(86) PCT No.: PCT/GB01/00246

§ 371 (c)(1),
(2), (4) Date: Oct. 17, 2002

(87) PCT Pub. No.: WO01/59196

PCT Pub. Date: Aug. 16, 2001

(65) Prior Publication Data

US 2003/0089139 A1 May 15, 2003

(30) Foreign Application Priority Data

Feb. 11, 2000 (GB) .................................. 0003008.0

(51) Int. Cl.
*D06F 21/00* (2006.01)
(52) U.S. Cl. .............................. 8/158; 8/159; 68/23 R; 68/58
(58) Field of Classification Search .................. 8/158, 8/159; 68/23 R, 23.5, 58, 207
See application file for complete search history.

(56) References Cited

U.S. PATENT DOCUMENTS

| 4,809,524 A | 3/1989 | Sikert et al. ................ 68/148 |
| 4,916,768 A * | 4/1990 | Broadbent .................... 8/159 |

(Continued)

FOREIGN PATENT DOCUMENTS

EP 0 740 009 10/1996

(Continued)

OTHER PUBLICATIONS

British Search Report, United Kingdom Patent Office, Sout Wales, United Kingdom, Jun. 30, 2000.

(Continued)

*Primary Examiner*—Joseph L. Perrin
(74) *Attorney, Agent, or Firm*—Morrison & Foerster LLP

(57) ABSTRACT

A method of rinsing a wash load in a washing machine having a perforated drum which is rotatable about an axis and capable of receiving the wash load and having a water inlet which is capable of introducing water to the interior of the rotatable drum includes the steps of rotating the drum about the axis at a first rotational speed sufficient to retain the wash load stationary with respect to the rotating drum; introducing rinse water into the interior of the rotating drum via the inlet so that the rinse water is sprayed from the inlet onto the wash load, the volume of rinse water so introduced being less than the volume required to saturate the wash load; and increasing the speed of rotation of the drum to a second rotational speed sufficient to spin a significant proportion of the rinse water out of the wash load.

39 Claims, 4 Drawing Sheets

U.S. PATENT DOCUMENTS

| | | | |
|---|---|---|---|
| 5,167,722 A | 12/1992 | Pastryk et al. | 134/33 |
| 5,191,668 A | 3/1993 | Euler et al. | 8/158 |
| 5,219,370 A | 6/1993 | Farrington et al. | 8/158 |
| 5,504,955 A * | 4/1996 | Mueller et al. | 8/158 |
| 5,606,877 A * | 3/1997 | Hashimoto | 68/12.04 |
| 5,737,790 A | 4/1998 | Badger et al. | 8/158 |
| 5,743,115 A | 4/1998 | Hashimoto | 68/12.12 |
| 5,758,377 A * | 6/1998 | Cimetta et al. | 8/158 |
| 6,125,490 A | 10/2000 | Riechman et al. | 8/158 |
| 2004/0010860 A1 * | 1/2004 | Johanski et al. | 8/158 |

FOREIGN PATENT DOCUMENTS

| | | |
|---|---|---|
| FR | 2 525 645 | 10/1983 |
| GB | 578637 | 7/1944 |
| GB | 2 303 642 | 2/1997 |

OTHER PUBLICATIONS

European Search Report, European Patent Office, Munich, Germany, May 21, 2001.

* cited by examiner

METHOD OF OPERATING A DOMESTIC APPLIANCE

FIELD OF THE INVENTION

The invention relates to a method of rinsing a wash load in a washing machine having a perforated drum which is rotatable about an axis and which is capable of receiving the wash load therein, and having a water inlet which is capable of introducing water to the interior of the rotatable drum.

BACKGROUND OF THE INVENTION

Traditional methods of rinsing textile articles after washing have generally used deep fill rinsing. When used in a horizontal axis machine, this method involves tumbling the articles in a sufficient quantity of water to saturate the articles and to provide an amount of excess water in which the tumbling action takes place. In a vertical axis machine, deep fill rinsing involves immersing the articles in a sufficient quantity of water to float the articles and causing agitation of the articles in the water. In both cases, the amount of water required to rinse the articles to an acceptable dilution level is considerable, particularly when repeated rinsing steps are carried out.

A number of proposals have been made with a view to reducing the amount of water required to be consumed in order to achieve an acceptable result. Many such proposals make use of the technique known as spray rinsing. This technique involves the introduction of the water used to rinse the articles into the drum via a spray nozzle or other spraying device whilst the drum is rotating at a speed sufficient to maintain the articles pressed against the walls of the drum. This causes the water to impinge directly onto the exposed surfaces of the textile articles as they rotate. The spray is directed so that, as the drum is rotated while the rinse water is introduced, the rinse water covers all of the exposed surfaces of the textile articles. An example of the manner in which rinse water can be introduced into a vertical axis washing machine by a spray rinsing method is shown in U.S. Pat. No. 4,809,524 to Sickert et al.

U.S. Pat. No. 5,167,722 to Pastryk et al also discloses a washing machine which makes use of the spray rinsing technique to rinse textile articles. In this disclosure, sufficient rinse water is sprayed onto the exposed surfaces of the articles to saturate the articles and to cause further rinse water to pass through the articles and into the tub of the machine. The rinse water collected in the tub of the machine is then recirculated to the spray nozzle and passed again through the articles. This recirculation continues for a predetermined period of time before the rinse water is drained from the machine. This recirculating rinse step is repeated up to 12 times. It is alleged that the level of detergent removal obtained by this method is equivalent to that obtained by deep fill rinse cycles but that the amount of water consumed is considerably less than that consumed by deep fill rinse cycles.

A similar method is disclosed in relation to a horizontal axis machine in U.S. Pat. No. 5,191,668 to Euler et al. Again, the rinse water is sprayed onto the exposed surfaces of the textile articles, passed through the articles and recirculated back to the spray nozzle. To achieve this, the amount of rinse water introduced to the interior of the drum must be considerably more than that required to saturate the textile articles. The patent also seems to contemplate an alternative spray rinse method in which the rinse water is not recirculated but is merely allowed to drain from the drum into a water outlet. It is believed that such a method will consume more water than a method which includes recirculation since a larger number of applications of rinse water will be required to achieve the required dilution level.

A further attempt to utilise the spray rinsing technique to reduce water consumption in the rinsing cycle of a washing machine is described in U.S. Pat. No. 5,737,790 to Badger et al. In the disclosed method, a timing device is used to provide a measure of the amount of water required to achieve a deep fill rinse. In subsequent rinsing steps, the amount of rinse water introduced is between 50% and 100% of that required for the deep fill rinse. A reduction in water consumption is achieved as long as the amount of rinse water introduced during the subsequent rinsing steps is less than 100%. During the rinsing steps, it is stated that the drain pump is operated so as to extract the water passing through the clothes.

In all of these prior art cases, the amount of rinse water introduced to the drum, and therefore to the textile articles to be rinsed, is still considerable. It is an object of the present invention to provide a method of rinsing textile articles in a washing machine which consumes less rinse water than comparable known rinsing methods. It is another object of the present invention to provide a method of rinsing textile articles utilising the spray rinsing technique and consuming less rinse water than has previously been thought possible. It is a further object of the present invention to provide an improved washing machine which makes use of the spray rinsing technique and consumes less rinse water than comparable washing machines.

SUMMARY OF THE INVENTION

The invention provides in a first aspect thereof, a method of rinsing a wash load in a washing machine having a perforated drum which is rotatable about an axis and which is capable of receiving the wash load therein, and having a water inlet which is capable of introducing water to the interior of the rotatable drum, the method comprising the steps of:

(a) rotating the drum about the axis at a first rotational speed sufficient to retain the wash load stationary with respect to the rotating drum;

(b) introducing rinse water into the interior of the rotating drum via the inlet so that the rinse water is sprayed from the inlet onto the wash load, the volume of rinse water so introduced being less than the volume required to saturate the wash load; and (c) increasing the speed of rotation of the drum to a second rotational speed sufficient to spin a significant proportion of the rinse water out of the wash load.

It has been found that good dilution levels can be achieved by spraying onto the rotating wash load an amount of rinse water which is less than the volume of water required to saturate the wash load, so that substantially all of the rinse water is absorbed within the wash load, and then subsequently increasing the speed of rotation to a higher speed to spin the rinse water out of the wash load. This, in effect, causes the rinse water to pass right through the wash load without requiring the volume of water to exceed the volume required for saturation. Repeated applications of rinse water in this manner achieves acceptable dilution levels in conjunction with greatly reduced rinse water consumption.

Preferably, the rinsing steps are repeated at least 4 times, more preferably 8 times and still more preferably 12 times. Even when the rinsing steps are repeated 12 times, the amount of rinsing water consumed is considerably less than that of comparable prior art methods such as those described above.

It is preferred that the second rotational speed is relatively high, preferably at least 800 rpm. Rotational speeds of at least 1000 and 1200 rpm are also preferable, particularly if the washing machine in which this method is performed is designed to spin at these rotational speeds.

Advantageously, the volume of rinse water sprayed onto the wash load during the or each step (b) is no more than 0.75 liters; more advantageously, no more than 0.5 liters. This allows the reduction in water consumption achievable by this method to be very considerable.

The invention provides, in a second aspect thereof, a method of rinsing a wash load in a washing machine having a perforated drum which is rotatable about an axis and which is capable of receiving the wash load therein, and having a water inlet which is capable of introducing water to the interior of the rotatable drum, the method comprising the steps of:

(a) rotating the drum about the axis at a first rotational speed sufficient to retain the wash load stationary with respect to the rotating drum; and
(b) introducing rinse water into the interior of the drum via the inlet so that the rinse water is sprayed from the inlet onto the wash load, the volume of rinse water so introduced being no more than 0.5 liters per kilogram of the stated capacity of the washing machine.

Preferably, step (b) is followed by the step of:
(c) increasing the speed of rotation of the drum to a second rotational speed sufficient to spin a significant proportion of the rinse water out of the wash load.

Since many washing machines have a stated capacity, usually measured in kilograms of dry load, it is convenient to specify the volume of rinse water in relation to that stated capacity. Providing a method which uses a volume of rinse water not exceeding 0.5 liters per kilogram of the stated capacity of the washing machine for the or each rinse step (b) results in a consumption of rinse water which is highly advantageous in comparison to other prior art methods.

The invention also provides a washing machine adapted and configured to carry out a method as described above.

BRIEF DESCRIPTION OF THE INVENTION

Embodiments of the invention will now be described with reference to the accompanying drawings, wherein.

Figure 1:
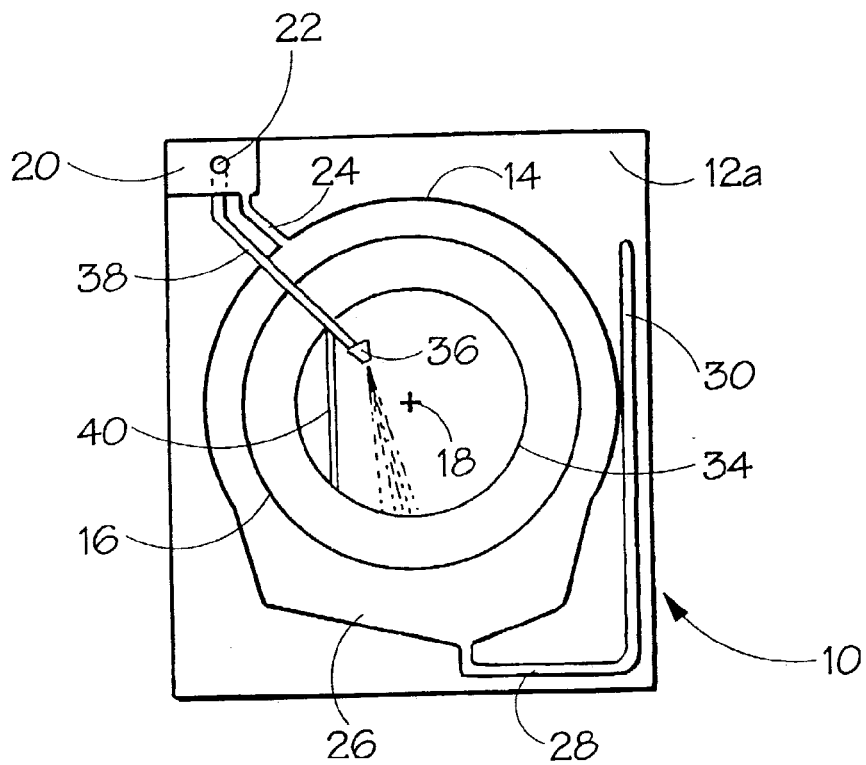
FIG. 1 is a schematic front view of a washing machine adapted and arranged to operate in accordance with a method according to the invention.
Figure 2:
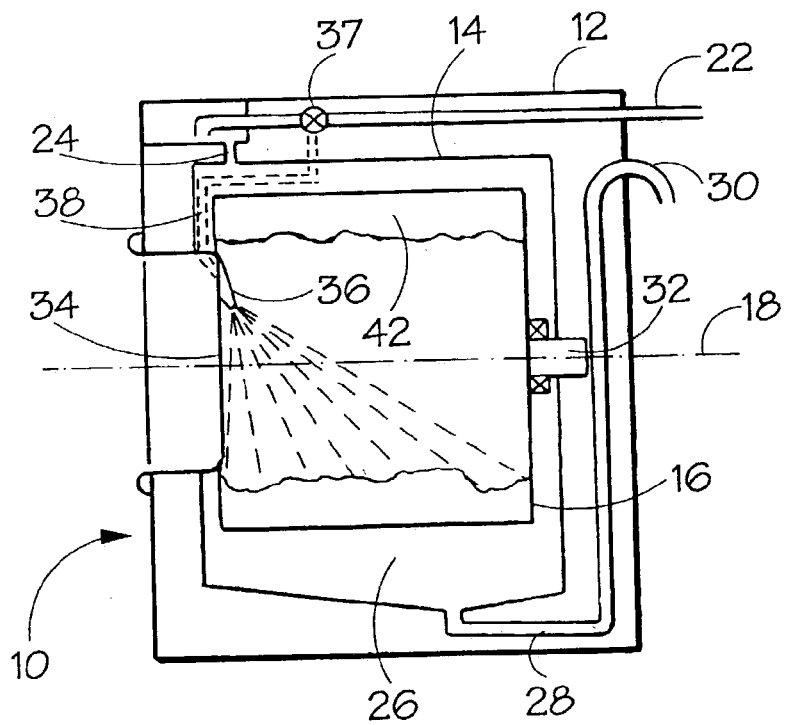
FIG. 2 is a schematic side view of the washing machine of FIG. 1.

A washing machine capable of carrying out a method according to the invention is illustrated in FIGS. 1 and 2. The washing machine 10 includes an outer casing 12 in which a stationary tub 14 is located. A drum 16 is mounted inside the tub 14 so as to be rotatable about an axis 18. The washing machine 10 includes a soap tray 20 capable of receiving detergent in a known manner. At least one water inlet 22 communicates with the soap tray 20 and is provided with suitable means for connection to a water supply within the environment in which the washing machine 10 is to be used. A conduit 24 is provided between the soap tray 20 and the tub 14 so as to allow water introduced via the inlet 22 to enter the tub 14. The tub 14 has a sump 26 located beneath the drum 16. A drainage pipe 28 communicates with the sump 26 and leads to a water outlet 30 via which water can be discharged from the washing machine 10. A pump (not shown) is provided to allow water to be pumped from the sump 26 to the water outlet 30 at appropriate stages of the washing cycle carried out by the washing machine 10.

The drum 16 is rotatably mounted about the axis 18 by way of a shaft 32. The shaft 32 is mounted in a known manner allowing the tub 14 to remain stationary whilst the drum 16 is rotatable with the shaft 32. The shaft 32 is rotatably driven by a motor (not shown) mounted within the outer casing 12 of the washing machine 10. A door 34 is located in the front panel 12a of the outer casing 12 to allow access to the interior of the drum 16. It is via the door 34 that a wash load can be deposited within the drum 16 before a wash cycle commences and removed therefrom at the end of the wash cycle.

FIGS. 1 and 2 also illustrate the provision of a spray nozzle 36 mounted on the door 34 of the washing machine 10. The spray nozzle 36 is connected to the water inlet 22 via a valve 37 so that, when required, water introduced to the washing machine 10 via the water inlet 22 can be passed to the spray nozzle 36 instead of to the tub 14 via the soap tray 20. The conduit 38 leading to the spray nozzle 36 conveniently passes close to the hinge 40 of the door 34 as shown in FIG. 1. This arrangement provides a convenient construction, although other constructions known from the prior art are equally suitable for use in the present embodiment.

DETAIL DESCRIPTION OF THE INVENTION

The spray nozzle 36 is constructed and directioned so that, when rinse water is introduced into the interior of the drum 16, the rinse water is sprayed onto the wash load 42 over the entire depth of the drum 16 (see FIG. 2). As will be appreciated by a skilled reader, the spray jets need cover only a relatively narrow portion of the wash load 42, as shown in FIG. 1. The entire wash load 42 will receive incoming rinse water sprayed by the spray nozzle 36 as long as the drum 16 completes at least one revolution about the axis 18 whilst the spray nozzle 36 is in operation.

The washing machine 10 includes electronic circuitry (not shown) designed and adapted to control various aspects of the wash cycle carried out by the washing machine 10. Specifically, the electronic circuitry is capable of controlling the amount of water introduced to the tub 14 or the drum 16 at different stages of the cycle; also whether the incoming water is delivered to the tub 14 or to the spray nozzle 36 by operation of the valve 37; also the speed and direction of rotation of the drum 16 about the axis 18 during various stages of the cycle; and also whether water is drained from the sump 26 to the water outlet 30. To achieve this, various timing, sensing and valve devices are incorporated into the washing machine 10. However, the location, arrangement and control of such devices are well known from the prior art and will be immediately apparent to a skilled reader. They do not form part of the present invention and will not therefore be described in any further detail here.

The washing machine 10 also has a stated capacity. The stated capacity of a washing machine is identified and determined by the manufacturer thereof. It is commonly communicated to the purchaser of the washing machine by being included in the literature which accompanies the washing machine, i.e. the operating manual or user guide. In the UK, washing machines commonly have a stated capacity of 4 kg. This means that the manufacturer considers that the washing machine is capable of washing a wash load of up to 4 kg (dry weight). It is also an indication that a wash load having a dry weight greater than this stated capacity may not be washed by the washing machine to as high a standard as would a load of no more than the stated capacity. It is therefore the users responsibility, if a high standard of wash is required, to ensure that the wash load does not exceed 4 kg in dry weight. There are some UK machines which have a stated capacity of up to 6 kg. It is known, but very uncommon, for the stated capacity of a domestic washing machine to be as high as 10 kg. In the illustrated embodiment, the stated capacity of the washing machine 10 is 4 kg.

Figure 3:
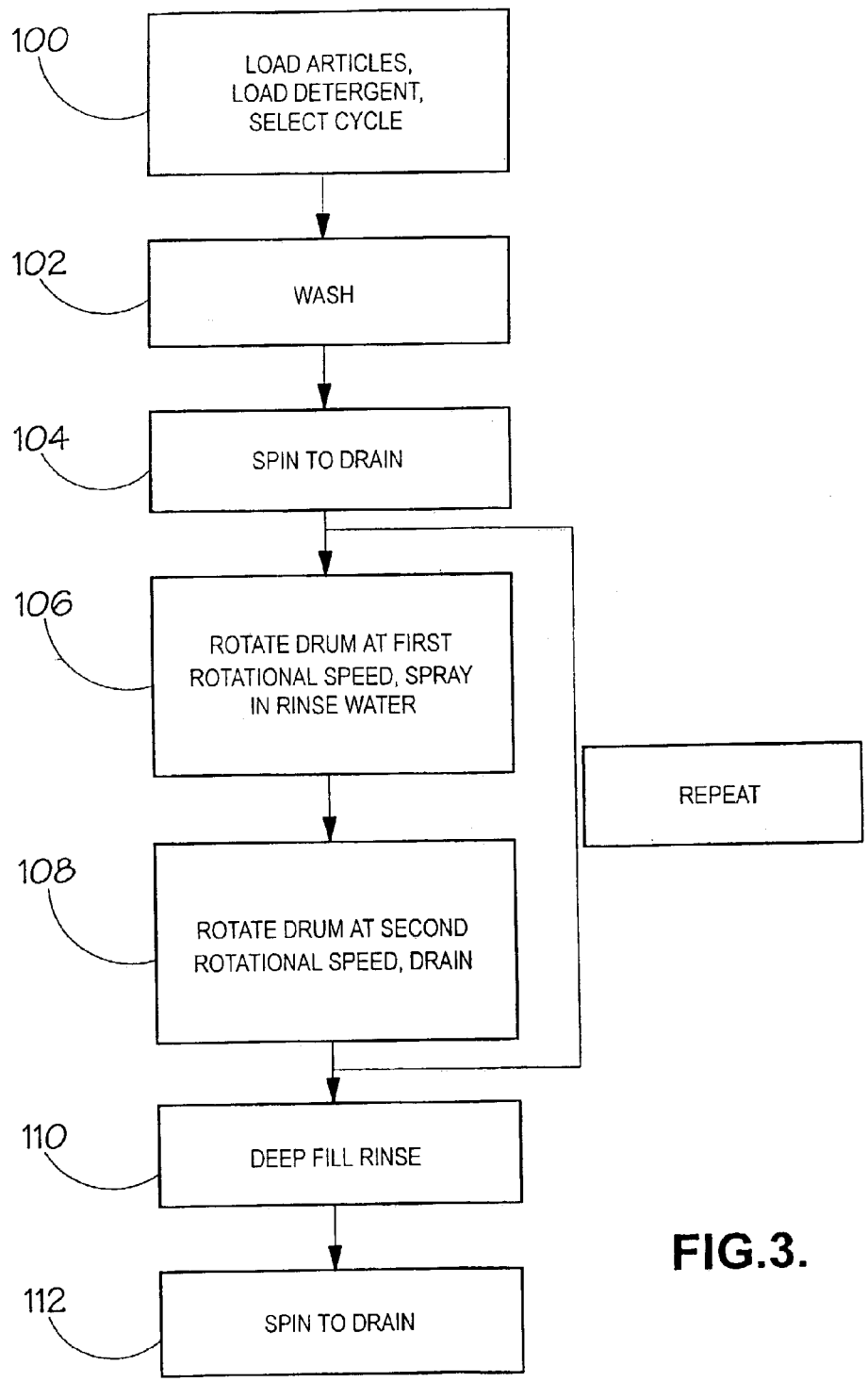
FIG. 3 is a block flow diagram illustrating, in general terms, a method according to the invention.

FIG. 3 illustrates, in general terms, a wash cycle used to wash a wash load in the washing machine 10 and incorporating a rinsing method according to the invention. The first step 100 in the wash cycle involves the wash load 42 being introduced to the interior of the drum 16 via the door 34. Detergent is also introduced to the washing machine 10, in the embodiment via the soap tray 20. Alternatively, liquid detergent can be placed in a suitable dispenser inside the drum 16. Fabric conditioner may also be introduced to the soap tray 20 or to the interior of the drum 16. The specific characteristics of the wash cycle to be carried out by the washing machine 10 (eg temperature, spin speed) are also selected by the user during this first step 100. It will be appreciated that the components of step 100 may be carried out in any order and over any appropriate and desired time frame.

The washing machine 10 then proceeds to carry out the wash step 102. This can, if required by the user, involve a pre-wash. Normally the wash step 102 will include introducing water and detergent to the tub 14 and the drum 16, the amount of water being sufficient to saturate the wash load 42 and to provide sufficient excess water within the tub 14 to achieve a minimum excess water level within the drum 16. The drum 16 is then rotated about the axis 18 at low speeds, commonly 30–40 rpm, so as to tumble the wash load 42 in the water and detergent. The rotation of the drum 16 is commonly reversed periodically.

Since the present invention is concerned with a method of rinsing a wash load in a washing machine, the details of the wash step 102 are not critical to the present invention. Any suitable wash step or combination of wash steps known from the prior art can be included at this stage of the wash cycle. The wash step 102 is carried out and then followed by a spin step 104 which involves rotating the drum 16 about the axis 18 at a moderately high rotational speed, eg, 400 rpm. During this spin step 104, much of the water used to wash the wash load 42 during the wash step 102 is centrifugally extracted from the wash load 42 and passed through the perforations in the drum 16 into the tub 14. The water thus extracted from the wash load 42 collects in the sump 26 and is pumped along the drainage pipe 28 to the water outlet 30. In this way, the wash water is discharged from the washing machine 10.

The rinsing method according to the invention is then commenced. The rinsing method essentially consists of a rinse water introduction step 106 and a rinse water extraction step 108, these steps 106,108 being repeated sequentially a number of times. During the rinse water introduction step 106, the drum 16 is rotated at a first rotational speed sufficient to maintain the wash load 42 pressed against the walls of the drum 16. It will be appreciated that the drum can be rotated at varying speeds during the rinse water introduction step 106, and that the varying speeds can be increasing or decreasing with time. The term "first rotational speed" must therefore be interpreted so as to include both a constant rotational speed and a range of rotational speeds. The first rotational speed (or range of speeds) is preferably within the range 400 rpm to 600 rpm but can be lower than 400 rpm or higher than 600 rpm. During this step, a volume of rinse water is introduced to the interior of the drum 16 via the spray nozzle 36. It is preferred, but it is not essential, that the majority of the rinse water is introduced via the spray nozzle 36 whilst the drum 16 is rotating at a constant first rotational speed. Alternatively, and if the first rotational speed is constant, the introduction of the rinse water to the drum 16 can commence before the first rotational speed is reached and, as a further alternative, the introduction can continue after the drum speed increases above the first rotational speed. A still further alternative is that the rinse water can be introduced to the interior of the drum 16 as the rotational speed thereof is ramping down from a higher rotational speed or up to a higher rotational speed. In these last two cases, the "first rotational speed" is a range of speeds.

The amount of spray water which is introduced into the interior of the drum 16 via the spray nozzle 36 is controlled by the electronic circuitry of the washing machine 10. The volume can be set to a specific volume such as 0.75 liters or even to as little as 0.5 liters. In an alternative embodiment of the method, the volume of rinse water introduced during the rinse water introduction step 106 is limited in dependence upon the stated capacity of the washing machine. In this event, the volume of rinse water is limited to 0.5 liters per kilogram of the stated capacity or, alternatively, to 0.25 liters per kilogram of the stated capacity.

Rinse water is introduced via the spray nozzle 36 over a period of time which can be as little as 5 seconds or as great as 2 minutes. During this time, the drum 16 is rotating about the axis 18. The rinse water is sprayed from the spray nozzle 36 directly onto the exposed surfaces of the wash load 42. If the first rotational speed is 400 rpm and the time taken to introduce the rinse water is 25 seconds, every portion of the exposed surface of the wash load 42 will pass beneath the spray nozzle 36 one hundred times. This ensures good distribution of the rinse water over the entire wash load 42.

The amount of rinse water which is introduced to the interior of the drum 16 during the rinse water introduction step 106 is considerably less than the volume of water required to saturate the wash load 42. Thus, at the end of the rinse water introduction step 106, the wash load 42 is wetted but not saturated. None of the rinse water introduced via the spray nozzle 36 passes through the perforations in the drum 16 and into the tub 14. There is therefore no collection of rinse water in the sump 26. All of the rinse water is absorbed by and remains within the wash load 42.

After the rinse water introduction step 106 has been completed, the rinse water extraction step 108 is commenced. The rotational speed of the drum 16 is increased to the second rotational speed, which is between 800 rpm and 1200 rpm. It is also envisaged that the second rotational speed could be as high as 1600 rpm. During this step 108, the rinse water introduced to the wash load 42 during the rinse water introduction step 106 is acted upon by centrifugal forces so as to force the rinse water radially outwardly through the wash load 42. The rinse water then passes through the perforations in the drum 16, into the tub 14 and then to the sump 26. The electronic circuitry ensures that the extracted rinse water is drained away through the drainage pipe 28 and the water outlet 30.

The rinse water introduction step 106 and the rinse water extraction step 108 are then repeated a number of times. After the first rinse water extraction step 108 has been completed, the rotational speed of the drum 16 is reduced to the first rotational speed and a second volume of rinse water is introduced to the interior of the drum 16 via the spray nozzle 36. Thereafter, the drum 16 is rotated at the second rotational speed in order to extract the second volume of rinse water which has previously been introduced to the wash load 42. It has been found that, by repeating the rinse water introduction step 106 and the rinse water extraction step 108 sequentially, dilution levels comparable to those achieved by one or more deep fill rinses can be achieved.

It is preferred that the rinsing method according to the invention, i.e. the consecutive application of the rinse water introduction step 106 and the rinse water extraction step 108 in a repetitive manner, is followed by a conventional deep fill rinse step 110 and a final spin step 112 during which the water collected in the sump 26 is pumped to the water outlet 30 via the drainage pipe 28.

Figures 4, 5:
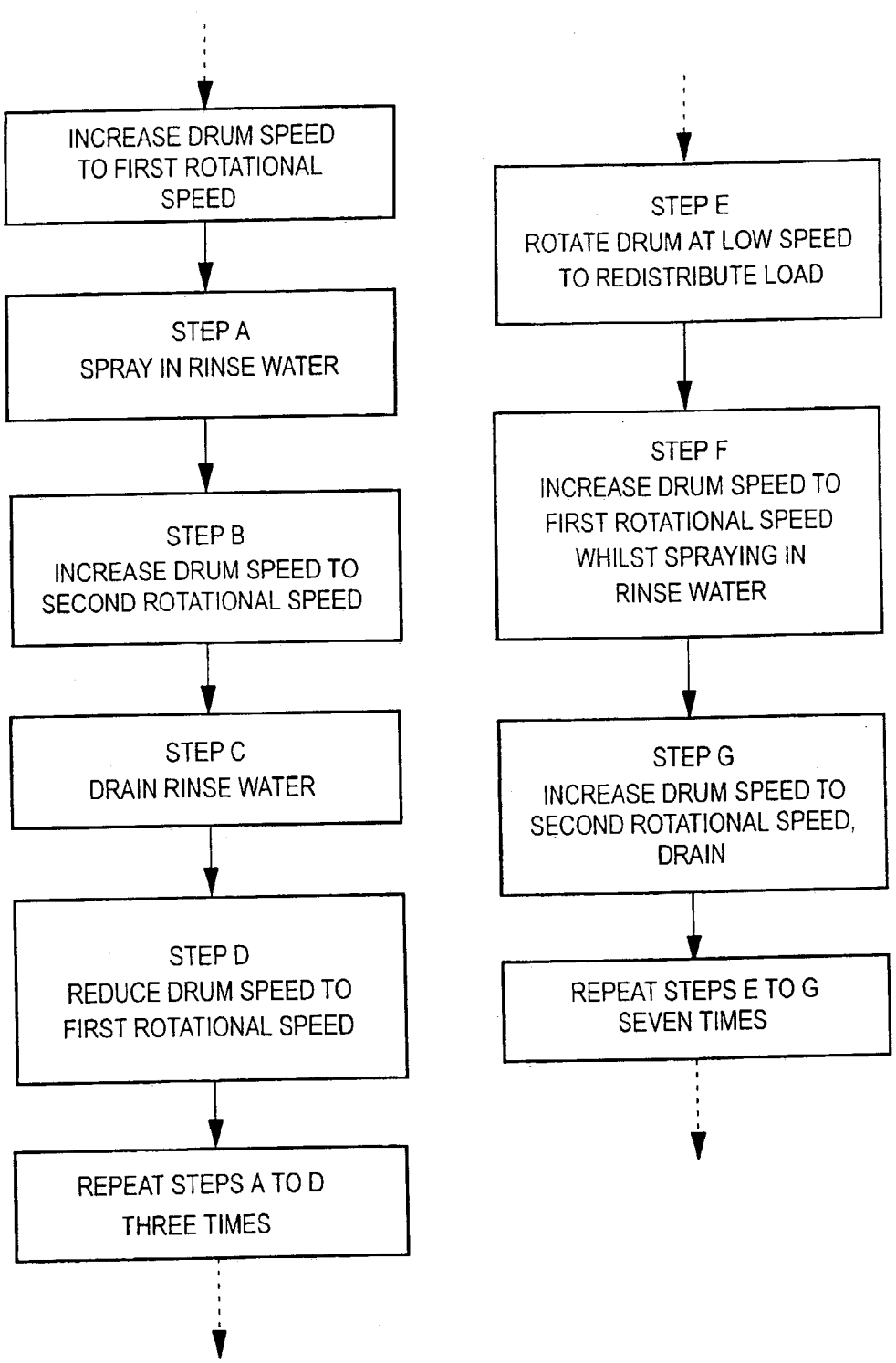
FIG. 4 is a block flow diagram illustrating, in more detail, part of the method of FIG. 3.
FIG. 5 is a block flow diagram, similar to FIG. 4, illustrating a first alternative method.

It will be appreciated that the general method described above in connection with FIG. 3 can incorporate many variations. Specifically, it will be appreciated that the first step 100, the wash step 102 and the spin step 104 can be varied to suit user requirements. These steps do not form part of the present invention. Similarly, the deep rinse step 110 and the final spin step 112 are optional and can be omitted or replaced with repeated high spin speed steps. The present invention is concerned with the rinsing steps 106, 108 which fall between the wash step 102 and the final rinse or spin steps 110,112, but even these rinsing steps 106, 108 can include some variation. A first alternative rinse method is illustrated in FIG. 4. It will be appreciated that the steps illustrated in FIG. 4 would replace the rinse water introduction and extraction steps 106,108 in the cycle shown in FIG. 3.

Referring now to FIG. 4, the rotational speed of the drum 16 is first increased to the first rotational speed. In this specific embodiment, the first rotational speed is 100 rpm. Only after the rotational speed of the drum 16 has reached the first rotational speed, i.e. 100 rpm, is the rinse water introduced into the interior of the drum 16 via the spray nozzle 36. The volume of rinse water sprayed into the interior of the drum 16 via the spray nozzle 36 is 0.75 liters. The time taken to introduce the spray water via the spray nozzle 36 is 2 minutes. The drum 16 completes 200 revolutions about the axis 18 whilst the rinse water is being sprayed onto the wash load 42. After all of the rinse water has been sprayed onto the exposed surfaces of the wash load 42, the rotational speed of the drum 16 is increased to the second rotational speed. In this embodiment, the second rotational speed is 800 rpm. The drum 16 continues to rotate at the second rotational speed for 2 minutes. During this step, the rinse water previously sprayed onto the wash load 42 is extracted therefrom by centrifugal forces. During its passage through the wash load 42 in the radial direction, the rinse water collects and carries with it residual dirt and detergent previously located in the wash load 42. The rinse water therefore causes rinsing of the wash load 42. The rinse water collects in the sump 26 and is drained therefrom by operation of the appropriate pump.

After the drum 16 has rotated at the second rotational speed for 2 minutes, its speed is reduced back to the first rotational speed, ie. 100 rpm. A second volume of rinse water, again 0.75 liters, is then sprayed onto the wash load 42 via the spray nozzle 36. Again, the time taken to introduce the rinse water to the wash load 42 is 2 minutes and, during this time, the drum 16 rotates at 100 rpm. Subsequently, the speed of the drum 16 is increased to 800 rpm again in order to extract the rinse water from the wash load. A further removal of residual detergent is effected. Two further sequential steps of rinse water introduction at the slower speed of 100 rpm and rinse water extraction at the higher spin speed of 800 rpm are then effected so that a total of four volumes of rinse water are successively introduced to and extracted from the wash load 42 in the manner described.

It will be readily understood that the total amount of rinse water used to carry out this method is 3.0 liters. A typical deep fill rinse will consume approximately 12 liters of rinse water in a washing machine of the type described at the outset. Therefore, even if a deep fill rinse step follows the rinsing method described in relation to FIG. 4, the total consumption of rinse water in the contemplated cycle is only 15 liters. This compares very favourably with a consumption of 36 liters as used by a washing machine making use of a method incorporating 3 separate deep fill rinses.

FIG. 5 illustrates another embodiment of the rinse method forming part of the wash cycle set out in FIG. 3 and forming an alternative to the method described in relation to FIG. 4. In the rinse method shown in FIG. 5, a redistribution step is carried out before the rinsing steps commence. During the redistribution step, the drum 16 is rotated about the axis 18 at a low speed of 30–40 rpm, rising to about 95 rpm, in order to tumble the wash load 42 within the drum in an attempt to distribute the wash load 42 evenly around the walls of the drum 16.

The rinsing method then commences by simultaneously increasing the rotational speed of the drum 16 to the first rotational speed of 400 rpm and introducing rinse water via the spray nozzle 36. Although the rinse water will begin to be introduced to the wash load 42 before the first rotational speed is reached, the majority of the rinse water is introduced to the wash load 42 whilst the drum 16 is rotating at 400 rpm. The volume of rinse water introduced during this step is 0.5 liters. However, the drum 16 is arranged to rotate at the first rotational speed for only 1 minute. It is therefore advantageous, in this case, to commence the introduction of the rinse water to the interior of the drum 16 shortly before the drum 16 reaches the first rotational speed in order to ensure that all of the rinse water is introduced to the wash load 42 before the next step is commenced.

The next step involves increasing the rotational speed of the drum to a high spin speed of 1200 rpm for a period of 2 minutes. As before, the rinse water is centrifugally extracted from the wash load 42 during this step and the rinse water is then drained from the sump 26. Thereafter, the rotational speed of the drum 16 is reduced to the first rotational speed (400 rpm) and a second volume of rinse water is introduced via the spray nozzle 36. These steps are repeated until a total of eight volumes of rinse water have been introduced to and subsequently extracted from the wash load 42.

A total of 4 liters of water is used during the rinsing method described above. Even if a deep fill rinse is subsequently carried out, the total consumption of rinse water is 16 liters.

Figure 6:
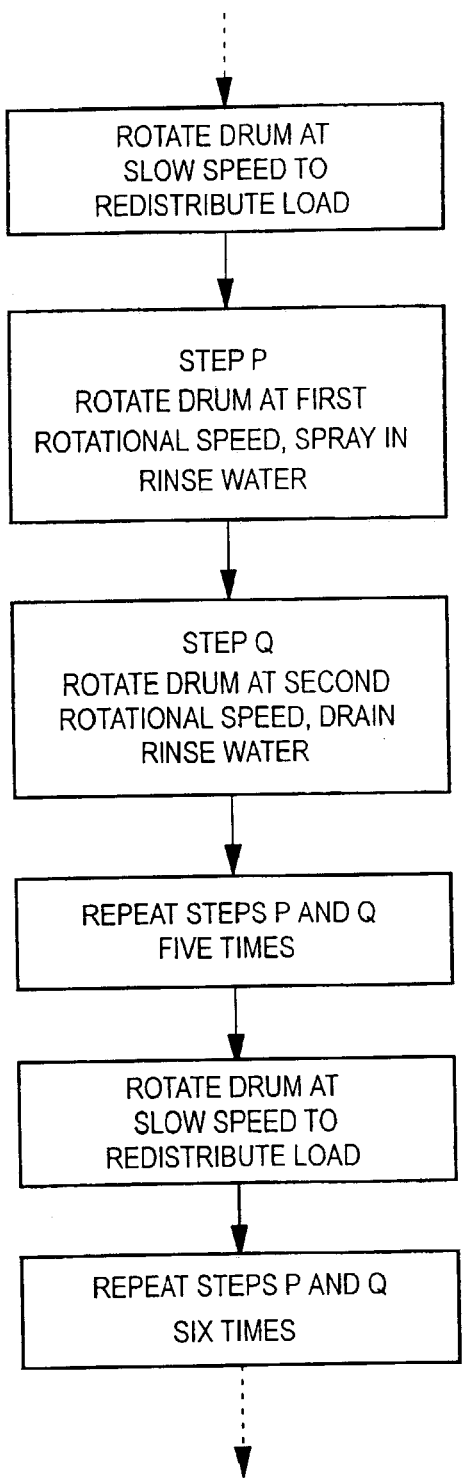
FIG. 6 is a block flow diagram, similar to FIGS. 4 and 5, illustrating a second alternative method.

A second alternative rinse method is illustrated in FIG. 6. In this method, a first redistribution step is carried out before the rinsing step commences, as described in connection with FIG. 5, and a second redistribution step is introduced halfway through the rinsing method. After the first redistribution step has been completed, the drum 16 increases its rotational speed to 600 rpm. As the rotational speed of the drum 16 increases, a volume of rinse water is sprayed into the drum 16 via the spray nozzle 36. The introduction of the rinse water is completed before the speed of 600 rpm is reached. The volume of the rinse water is 0.25 liters for each kilogram of the stated capacity of the washing machine 10. The stated capacity of the washing machine 10 is 4 kg as stated above. Thus the volume of rinse water introduced to the wash load 42 is 1.0 liter. The time taken to introduce the rinse water to the wash load is 20 seconds. As soon as the rotational speed of 600 rpm is reached, the rotational speed of the drum 16 is increased to a second rotational speed of 1000 rpm for a duration of 1 minute. During this time, the rinse water is extracted from the wash load 42 and collected in the sump 26 from where it is drained to the water outlet 30.

After the rinse water extraction step has been completed, the rotational speed of the drum 16 is reduced to 600 rpm again. As the speed of the drum 16 ramps down, the second volume of rinse water is introduced, the introduction step being completed before the rotational speed of 600 rpm is reached, and the rotational speed of the drum 16 is then increased again to 1000 rpm in order to extract the rinse water from the wash load. Thereafter, the sequential steps of introducing 1.0 liter of rinse water to the wash load 42 as the drum rotational speed reduces to 600 rpm over a period of 20 seconds, followed by increasing the rotational speed of the drum to 1000 rpm for one minute so as to extract the rinse water from the wash load 42 are repeated so that a total of six volumes of rinse water are introduced and extracted. Next, the rotational speed of the drum 16 is slowed to a speed of 30–40 rpm, rising to about 95 rpm, so as to effect a second redistribution step. After the redistribution step has been completed, six further applications and extractions of rinse water, 1.0 liter each time, are carried out. Thus, a total of twelve volumes of rinse water are applied to and extracted from the wash load 42.

The amount of rinse water consumed during this method is the same as that consumed during a single deep fill rinse (12 liters). However, the dilution levels achieved are sufficiently high to allow the suggested final deep fill rinse step 110 to be omitted. If desired, however, a deep fill rinse step can be included in the complete cycle after the rinsing method shown in FIG. 6 has been completed.

It will be appreciated that the invention is not limited to the precise details of the embodiments described above. For example, the first rotational speed (or range of speeds) can be selected at any suitable speed and need not be within the range 100–600 rpm. However, the rotational speed of the drum 16 must not be so high that all of the rinse water sprayed on to the wash load 42 passes directly therethrough and out of the perforations in the drum 16. It is required that the rinse water remains within the wash load 42 so that it is absorbed therein for at least a short period of time. This assists with the removal of residual detergent from the wash load 42. In any case, water is introduced whilst the drum 16 is rotating at a speed which is less than the second rotational speed. It will also be appreciated that the duration of the various steps can be varied in order to suit requirements. However, the time for which the drum 16 rotates at the first rotational speed (or range of speeds) must be sufficient to allow the volume of rinse water to be sprayed into the interior of the drum 16 and onto the wash load 42. Furthermore, the time for which the drum 16 rotates at the second rotational speed must be sufficient to ensure that a significant proportion of the previously applied rinse water is extracted from the wash load 42 and passed to the interior of the tub 14.

The volume of rinse water introduced to the wash load 42 during each rinse water introduction step can be varied from the volumes stated above. However, as has been stated above, when the volume of rinse water introduced during each rinse water introduction step 106 is dependent on the stated capacity of the washing machine, the volume of rinse water introduced during each step should not exceed 0.5 liters per kilogram of the stated capacity. It is preferred that the volume of rinse water introduced during each rinse water introduction step is no greater than 0.25 liters per kilogram of the stated capacity. Thus, for a washing machine having a stated capacity of 4 kg, the volume of rinse water introduced during each rinse water introduction step should not exceed 2 liters and is more preferably no more than 1 liter. For a washing machine having a stated capacity of 6 kg, the volume of rinse water introduced during each rinse water introduction step should not exceed 3 liters and is more preferably no more than 1.5 liters. Similarly, for a washing machine having a stated capacity of 10 kg, the volume of rinse water introduced during each rinse water introduction step should not exceed 5 liters and is more preferably no more than 2.5 liters.

Other variations and alternative arrangements will be apparent to a skilled reader. It is, for example, envisaged that the spray nozzle could be located in the washing machine in a position other than the door. Other viable locations include the rubber seal surrounding the door, and also the area of the drum close to the point of support remote from the door.

The invention claimed is:

1. A method of rinsing a wash load in a washing machine having a perforated drum which is rotatable about an axis and which is capable of receiving the wash load therein, and having a water inlet which is capable of introducing water to the interior of the rotatable drum, the method comprising the steps of:
   (a) rotating the drum about the axis at a first rotational speed sufficient to retain the wash load stationary with respect to the rotating drum;
   (b) introducing rinse water into the interior of the rotating drum via the inlet so that the rinse water is sprayed from the inlet onto the wash load, the volume of rinse water so introduced being less than the volume required to saturate the wash load; and
   (c) increasing the speed of rotation of the drum to a second rotational speed sufficient to spin a significant proportion of the rinse water out of the wash load;
   the rinse water being introduced into the interior of the drum in step (b) upon completion of a washing step without saturating the wash load.

2. A method as claimed in claim 1, wherein steps (a) to (c) are repeated at least 4 to 12 times.

3. A method as claimed in claim 1, wherein the first rotational speed is at least 100 rpm.

4. A method as claimed in claim 3, wherein the first rotational speed is at least 400 rpm.

5. A method as claimed in claim 1, 2, 3 or 4, wherein the step of increasing the speed of rotation of the drum to the second rotational speed is commenced after the step of introducing the rinse water to the interior of the drum has been completed.

6. A method as claimed in claim 1, wherein the volume of rinse water sprayed onto the wash load during step (b) is no more than 0.75 liters.

7. A method as claimed in claim 6, wherein the volume of rinse water sprayed onto the wash load during step (b) is no more than 0.5 liters.

8. A method as claimed in claim 1, wherein the drum rotates at the second rotational speed for a longer period of time than that for which the drum rotates at the first rotational speed.

9. A method as claimed in claim 8, wherein the drum rotates at the second rotational speed for a period of time at least twice as long as that for which the drum rotates at the first rotational speed.

10. A method as claimed in claim 1, wherein the step of introducing the rinse water to the interior of the rotating drum is commenced before the drum has reached the first rotational speed.

11. A method as claimed in claim 10, wherein the step of introducing the rinse water to the interior of the rotating drum is completed after the drum has reached the first rotational speed.

12. A method as claimed in claim 1, wherein the step of introducing the rinse water to the interior of the rotating drum is commenced after the drum has reached the first rotational speed.

13. A method as claimed in claim 1, further comprising an additional rinse step subsequent to the completion of step (c).

14. A method of rinsing a wash load in a washing machine having a perforated drum which is rotatable about an axis and which is capable of receiving the wash load therein, and having a water inlet which is capable of introducing water to the interior of the rotatable drum, the method comprising the steps of:
  (a) rotating the drum about the axis at a first rotational speed sufficient to retain the wash load stationary with respect to the rotating drum;
  (b) introducing rinse water into the interior of the drum via the inlet so that the rinse water is sprayed from the inlet onto the wash load, the volume of rinse water so introduced being no more than 0.5 liters per kilogram of the stated capacity of the washing machine; and
  (c) increasing the speed of rotation of the drum to a second rotational speed sufficient to spin a significant proportion of the rinse water out of the wash load;
  the rinse water being introduced into the interior of the drum in step (b) upon completion of a washing step without saturating the wash load.

15. A method as claimed in claim 14, wherein steps (a) to (c) are repeated at least 4 to 12 times.

16. A method as claimed in claim 14, wherein the second rotational speed is 800 to 1200 rpm.

17. A method as claimed in claim 14, wherein the drum rotates at the second rotational speed for a longer period of time than that for which the drum rotates at the first rotational speed.

18. A method as claimed in claim 17, wherein the drum rotates at the second rotational speed for a period of time at least twice as long as that for which the drum rotates at the first rotational speed.

19. A method as claimed in claim 14, 15, 16, 17 or 18, wherein the step of increasing the speed of rotation of the drum to the second rotational speed is commenced after the step of introducing the rinse water to the interior of the drum has been completed.

20. A method as claimed in claim 14, 15, 16, 17 or 18, wherein the step of introducing the rinse water to the interior of the rotating drum is commenced after the drum has reached the first rotational speed.

21. A method as claimed in claim 1, 2, 3, 14, 15, 16, 17 or 18, wherein the first rotational speed is constant during the step of introducing rinse water into the interior of the drum via the inlet.

22. A method as claimed in claim 14, further comprising an additional rinse step subsequent to the completion of step (c).

23. A method as claimed in claim 14, wherein the first rotational speed is at least 100 rpm.

24. A method as claimed in claim 23, wherein the first rotational speed is 200 to 400 rpm.

25. A method as claimed in claim 14, wherein the volume of rinse water sprayed onto the wash load during step (b) is no more than 0.75 liters.

26. A method as claimed in claim 25, wherein the volume of rinse water sprayed onto the wash load during step (b) is no more than 0.5 liters.

27. A method as claimed in claim 14, wherein the volume of rinse water introduced into the interior of the drum is no more than 0.25 liters per kilogram of the stated capacity of the washing machine.

28. A method as claimed in claim 14, wherein the step of introducing the rinse water to the interior of the rotating drum is commenced before the drum has reached the first rotational speed.

29. A method as claimed in claim 28, wherein the step of introducing the rinse water to the interior of the rotating drum is completed after the drum has reached the first rotational speed.

30. A method as claimed in claim 1 or 14, wherein the first rotational speed decreases during the step of introducing rinse water into the interior of the drum via the inlet.

31. A method as claimed in claim 1 or 14, wherein the first rotational speed increases during the step of introducing rinse water into the interior of the drum via the inlet.

32. A washing machine adapted and configured to carry out the method according to claim 1 or 14.

33. A washing machine as claimed in claim 32, having an axis of drum rotation that is substantially horizontal.

34. A washing machine as claimed in claim 32, wherein the washing machine has a stated capacity of less than 10 kg.

35. A washing machine as claimed in claim 34, wherein stated capacity of the washing machine is between 3 kg and 7 kg.

36. A washing machine as claimed in claim 35, wherein the stated capacity of the washing machine is substantially 4 kg.

37. A washing machine as claimed in claim 33, wherein the washing machine has a stated capacity of less than 10 kg.

38. A washing machine as claimed in claim 37, wherein stated capacity of the washing machine is between 3 kg and 7 kg.

39. A washing machine as claimed in claim 38, wherein the stated capacity of the washing machine is substantially 4 kg.

* * * * *